United States Patent
Clarke

[11] 3,802,281
[45] Apr. 9, 1974

[54] DRIVING ARRANGEMENTS FOR LEADSCREWS

[75] Inventor: Denis Kevin Charles Clarke, Wolverhampton, England

[73] Assignee: Lucas Aerospace Limited, Birmingham, England

[22] Filed: Oct. 26, 1972

[21] Appl. No.: 301,254

[52] U.S. Cl............. 74/89.15, 192/56 R, 74/459, 192/7
[51] Int. Cl............................................. F16h 27/02
[58] Field of Search............... 74/89.15, 424.8, 459; 192/56 R, 56 C, 56 L, 56 F

[56] References Cited
UNITED STATES PATENTS

| 3,722,644 | 3/1973 | Steinhagen | 192/56 R |
| 2,623,403 | 12/1952 | Terdina | 74/459 |
| 3,203,523 | 8/1965 | Gilder et al. | 192/56 R |
| 3,237,742 | 3/1966 | Ulbing | 192/56 R |
| 3,240,304 | 3/1966 | Wickersham | 192/56 R |
| 3,269,199 | 8/1966 | Deehan et al. | 74/89.15 |

Primary Examiner—Benjamin W. Wyche
Assistant Examiner—Wesley S. Ratliff, Jr.
Attorney, Agent, or Firm—Holman & Stern

[57] ABSTRACT

A driving arrangement for a leadscrew which can be subjected to an axial load includes a nut member engaging the leadscrew, a drive member resiliently coupled to the nut member so as to be rotatable relative to the nut member at a predetermined torque load, and braking means operable to arrest said drive and nut members as a result of said relative rotation. There is also provided a braking means to prevent rotation of the nut member by the leadscrew in response to an axial load thereon in at least one direction.

10 Claims, 6 Drawing Figures

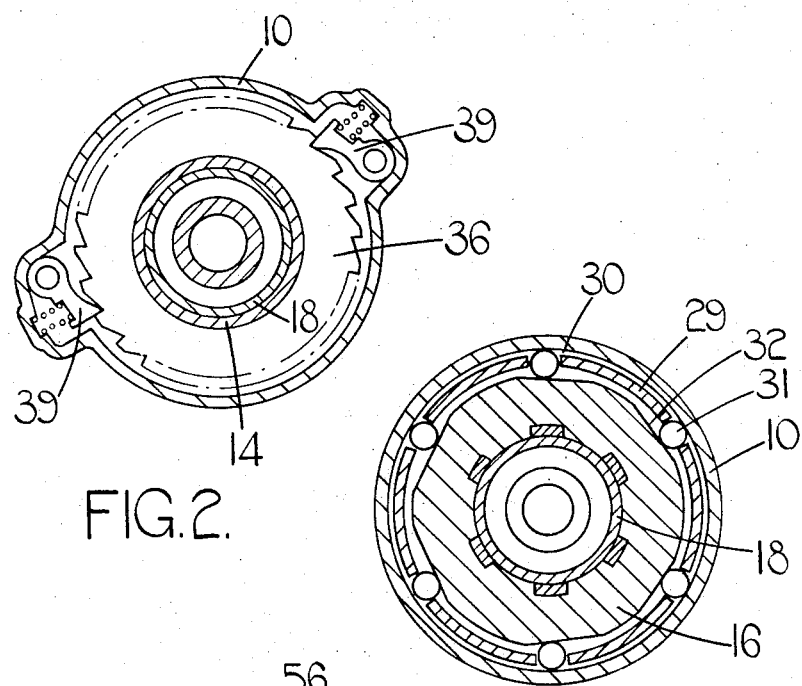
FIG.2.
FIG.3.
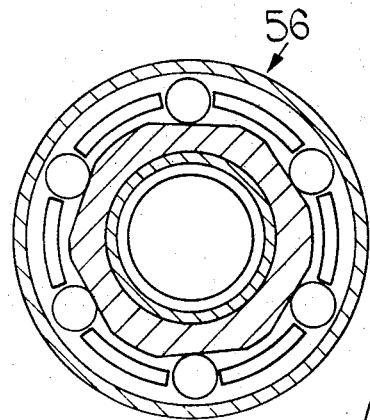
FIG.5.
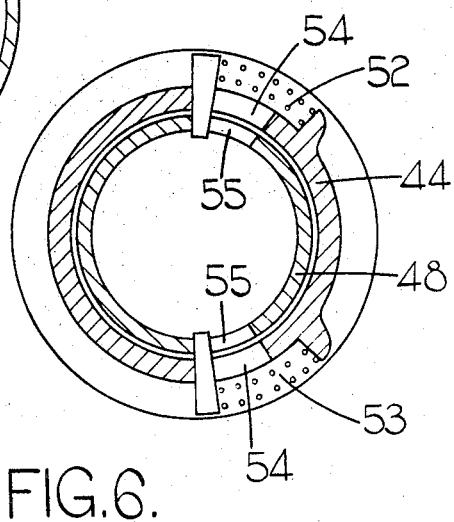
FIG.6.

PATENTED APR 9 1974

DRIVING ARRANGEMENTS FOR LEADSCREWS

This invention relates to driving arrangements for leadscrews and has as an object to provide such an arrangement in a form.

According to the invention a driving arrangement for a leadscrew to which, in use, axial loads are applied comprises a body, a nut member rotatable in the body and engageable with the leadscrew, a driving member coaxial with the nut member, resilient coupling means interconnecting said drive and nut members and permitting relative rotation between said members when the torque on the coupling means exceeds a predetermined value, braking means, operable as a result of relative rotation between the members in either direction, to arrest rotation of the members relative to the body, means limiting relative axial movement between the members, and a friction device engageable by the drive member as a result of an axial load on the leadscrew in one direction to prevent rotation of the said members under the influence of the said axial load.

Examples of the invention will now be described with reference to the accompanying drawings, in which:

FIGS. 2 and 3 are sections on the corresponding lines in FIG. 1,

FIG. 5 is a section on line 5—5 in FIG. 4, and

FIG. 6 shows the principle of operation of a part of the arrangement of FIG. 4.

Figure 1:
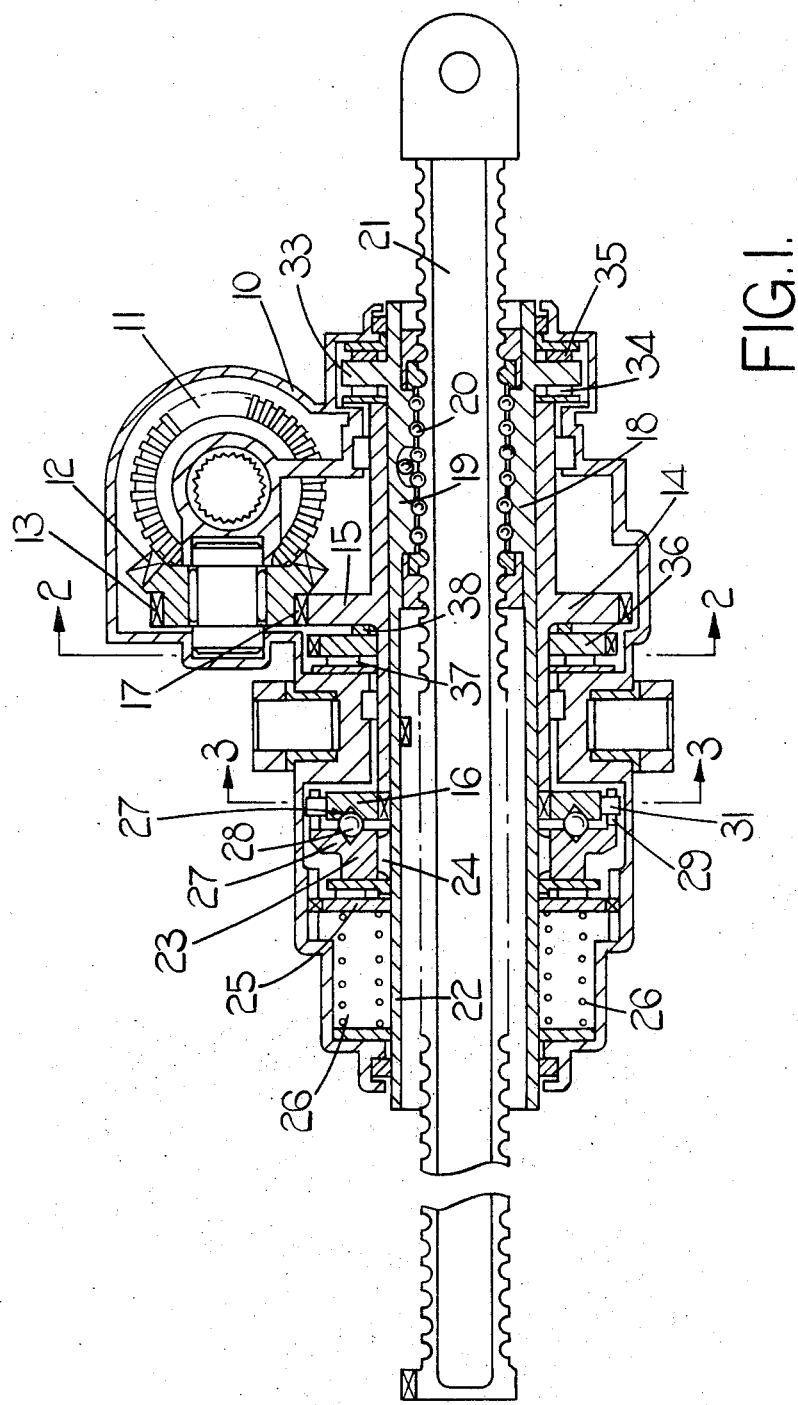
FIG. 1 is a section through a driving arrangement according to the invention.

Referring first to the embodiment shown in FIGS. 1 to 3, a driving arrangement has a body 10 within which are journalled a pair of meshed bevel gears 11, 11. Integral with bevel gear 12 is a spur gear 13. A tubular drive member 14 is journalled in the body 10 and has a pair of flanges 15, 16. Flange 15 is formed with gear teeth 17 which mesh with spur gear 13. Rotatable within drive member 14 is a nut member 18 having a carrier portion 19 for recirculating balls 20 which engage a leadscrew 21 having a right hand thread.

Nut member 18 also includes a tubular portion 22 and a ring 23 slidable on splines 24 of portion 22. Ring 23 is engaged by a thrust bearing 25 which is also slidable on nut member 18 and is biased towards flange 16 by springs 26. Flange 16 and ring 23 are provided with aligned depressions 27 which locate balls 28.

Ring 23 has an axially extending portion 29 formed with slots 30 within which lie rollers 31. Flange 16 has flats 32 on its periphery, flats 32 locating the rollers 31 adjacent an inner wall of the body 10. The diameter of flange 16 between the flats is such that rollers 31 are jammed between flange 16 and body 10 as a result of relative rotation between drive member 14 and nut member 18.

Carrier portion 19 of nut member 18 has a flange 33. A thrust bearing 34 is engaged between body 10 and the side of flange 33 adjacent flange 15 on drive member 14. A friction pad 35 on body 10 is engageable by the other side of flange 33.

Rotatably surrounding drive member 14 between flanges 15, 16 is a ratchet wheel 36, and a thrust bearing 37 is engaged between the body 10 and the side of ratchet wheel 36 remote from flange 15. A friction pad 38 is interposed between adjacent faces of flange 15 and ratchet wheel 36. The dimensions of the drive member 14 are such that, when the latter is urged into frictional engagement with pad 38, there is very small axial clearance between the end of member 14 and the thrust bearing 34, whereby effectively locating member 14 axially with respect to member 18. Mounted in body 10 and engageable with ratchet wheel 36, so as to prevent rotation thereof in a clockwise direction as seen on line 2—2, are spring loaded pawls 39.

In use, gear 11 is rotated in either direction by an external power source (not shown) to rotate drive member 14 via gears 12, 13. Under normal loading conditions rotation of drive member 14 is transmitted via balls 28 and splines 24 to nut member 18 and thereby moves leadscrew 21 axially in a required direction.

If the axial load on the leadscrew 21 is such that the required driving torque exceeds a predetermined value, typically 120 percent of the maximum working torque, balls 28 ride up the sides of the associated depressions 27, permitting relative angular movement between members 14, 18. This angular movement causes rollers 28 to jam, as above described and thereby to arrest movement of the drive arrangement.

If when no drive is applied to gear 11, leadscrew 21 is subjected to an axial load urging it to the left, as seen in FIG. 1, the drive member 14 is also urged to the left by the nut member 18 acting via the thrust bearing 34. Flange 15 and ratchet wheel 36 are thereby frictionally coupled via pad 38. The resultant direction of rotation of wheel 36 would be clockwise as seen in FIG. 2, but is arrested by pawls 39. The coefficient of friction between pad 38 and flange 15 and wheel 36 respectively is such that the resultant friction torque is greater than the torque applied to drive member 14 by the axial load. In these circumstances there will be no rotation of the drive arrangement and axial movement of leadscrew 21 is arrested.

If, with no drive on gear 11, leadscrew 21 is urged to the right by an axial load, flange 33 frictionally engages pad 35, the coefficient of friction being, as before, sufficient to arrest movement of leadscrew 21.

When, in the condition of leftward axial loading described above, the drive arrangement is energised to move the leadscrew 21 against the load, the drive member 14 is rotated anti-clockwise as seen in FIG. 2. The pawls 39 do not prevent rotation of wheel 36 which rotates with member 14, and the arrangement operates normally to urge the leadscrew 21 to the right.

If, during leftward axial loading the drive is energised to move leadscrew 21 leftwards, the torque applied to flange 15 via gear 13 is added to that due to the axial loading. This increased torque is sufficient to overcome the friction torque on pad 38 and drive member 14 rotates relative to ratchet wheel 36.

Similarly, in conditions of rightward axial loading, a drive applied to urge the leadscrew 21 in the direction of the load provides a total torque which overcomes the friction torque on pad 35.

Figure 4:
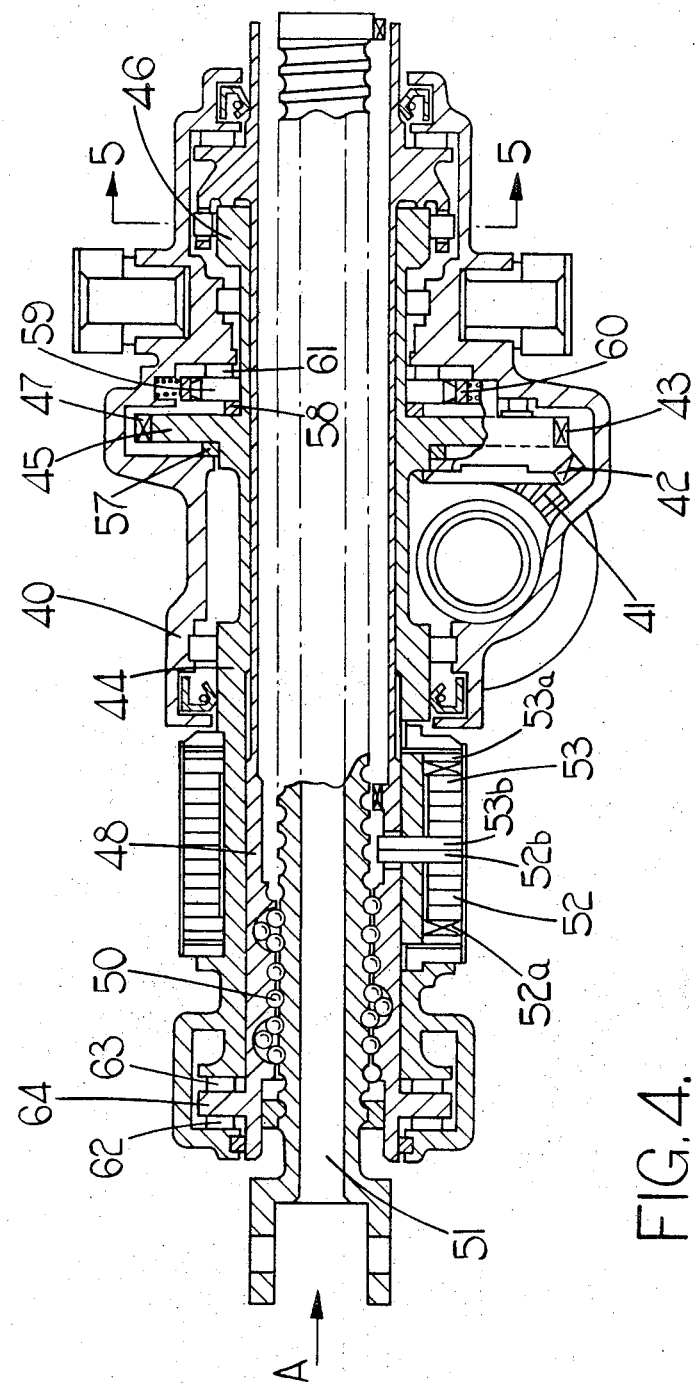
FIG. 4 is a section through an alternative form of driving arrangement.

The embodiment of FIGS. 4, 5 and 6 has a body 40 within which are journalled meshed bevel gears 41, 42, a spur gear 43 integral with gear 42, a tubular drive member 44 having flanges 45, 46 gear teeth 47 on flange 45 meshing with gear 43, and a nut member 48 within drive member 44 and engageable via recirculating balls 80 with a leadscrew 51. All these components are generally similar to the corresponding components described with reference to FIGS. 1 to 3.

Coupling between drive member 44 and nut member 48 is effected by a pair of torsion springs 52, 53. Ends 52a, 53a of the respective springs engage the drive member 44. The other ends 52b 53b of the springs pass through axially aligned slots 54, 55 in the drive member 44 and nut member 48 respectively. The function of springs 52, 53 may be understood from FIG. 6 which shows their principle of operation, as viewed in the direction of arrow A. Springs 52,53 are shown diagrammatically as compression springs, and are preloaded so as to urge nut member 48 to an equilibrium angular position relative to drive member 44. The preloading of springs 52, 53 is such that there is no relative rotation between members 44,48 until the driving torque reaches 120 percent of normal maximum value.

As shown in FIG. 5, the nut and drive members are provided with a roller braking arrangement 56 which operates in the manner described above to arrest rotation of the members as a result of relative rotation between them.

A pair of friction discs 57,58 are located on opposite sides of flange 45. Disc 57 is engageable between flange 45 and body 40 when member 44 is urged leftwards under the influence of an external load. Disc 58 is located between flange 45 and a ratchet wheel 59 which is engaged by pawls 60 to prevent wheel 59 from rotating in an anti-clockwise direction, as viewed by arrow A. A thrust bearing 61 is located between the side of ratchet wheel 59 remote from flange 45 and the body 40. A further pair of thrust bearings 62,63 are located on opposite sides of a flange 64 on nut member 48 and are engageable with oppositely directed faces on drive member 44. The permitted axial movement of member 48 relative to member 44 is such that flange 45 can frictionally engage either body 40 or ratchet wheel 59 via the respective discs 57,58.

In use, members 44,48 are prevented from rotating under the effect of a rightward axial load on leadscrew 51 by the action of ratchet wheel 59, substantially as described above. Leftward axial loads cause friction disc 57 to engage with body 40 and flange 45 to prevent rotation of members 44,48. The coefficients of friction of discs 57, 58 are such that the friction torques thereof are always greater than the torques on flange 45 due to axial load.

Energisation of the drive arrangement in either direction during the leftward axial load condition provides an increased torque which overcomes the friction torque to rotate members 44,48. Energisation of the arrangement to move leadscrew 51 against a rightward axial load causes ratchet wheel to rotate freely with members 44,48. Energisation to move leadscrew in the direction of a rightward load overcomes the friction torque of disc 58, as before.

The drive arrangements described are particularly adapted for the operation of flap jacks and slat jacks on aircraft, and for this purpose the respective bodies 10, 40 incorporate gimbal mountings by means of which the arrangements are, in use, secured to an airframe.

I claim:

1. A driving arrangement for a leadscrew to which, in use, axial loads are applied, comprising a body, a nut member rotatable in the body and engageable with the leadscrew, a driving member coaxial with the nut member, resilient coupling means interconnecting said drive and nut members and permitting relative rotation between said members when the torque on the coupling means exceeds a predetermined value, braking means, operable as a result of relative rotation between the members in either direction, to arrest rotation of the members relative to the body, means limiting relative axial movement between the members, and a friction device engageable by the drive member as a result of an axial load on the leadscrew in one direction to prevent rotation of the said members under the influence of the said axial load.

2. An arrangement as claimed in claim 1 in which said nut member includes a carrier and recirculating balls engageable with the leadscrew.

3. An arrangement as claimed in claim 1 in which said braking means comprises a flange on said drive member formed with a plurality of relieved portions on its periphery, and a plurality of elements carried by said nut member and located between said relieved portions and a surrounding part of said body, said relative rotation urging said members into engagement with said relieved portions and said surrounding body part.

4. An arrangement as claimed in claim 1 in which said drive member is of generally tubular form and surrounds said nut member.

5. An arrangement as claimed in claim 1 which includes a ratchet wheel coaxial with said drive member and rotatable thereby in one direction relative to said body.

6. An arrangement as claimed in claim 5 which includes friction means engageable with said ratchet wheel and said drive member when the latter is at one end of its limited axial movement relative to said nut member.

7. An arrangement as claimed in claim 6 which includes further friction means engageable with said body and said drive member when the latter is at the other end of its limited axial movement relative to said nut member.

8. An arrangement as claimed in claim 6 which includes further friction means engageable with said body and said nut member, said further friction means being so engaged in response to movement of said nut member by said drive member when the latter is at the other end of its limited axial movement relative to the nut member.

9. An arrangement as claimed in any of claim 1 in which said resilient coupling means comprises a pair of relatively axially movable ring members rotatable by said drive member and said nut member respectively, adjacent faces of said ring members having recesses which are aligned when said torque does not exceed said predetermined value, a coupling element located in said recesses between said ring members, and means biasing said ring members towards one another, whereby at torques exceeding said predetermined value, said ring members are urged apart against said biasing means to permit said relative rotation.

10. An arrangement as claimed in any one of claim 1 in which said resilient coupling means comprises first and second springs engaging said nut member and said drive member so as to urge the latter to rotate relative to the former in respective opposite directions, said springs being preloaded to prevent relative movement from a resultant equilibrium position when said torque does not exceed said predetermined value.

* * * * *